US012687217B2

(12) United States Patent
Sukegawa et al.

(10) Patent No.: US 12,687,217 B2
(45) Date of Patent: Jul. 21, 2026

(54) DRIVE TRANSMISSION MECHANISM AND RECORDING APPARATUS INCLUDING DRIVE TRANSMISSION MECHANISM

(71) Applicant: CANON KABUSHIKI KAISHA, Tokyo (JP)

(72) Inventors: Katsuaki Sukegawa, Kanagawa (JP); Yasuyuki Takanaka, Kanagawa (JP); Masakazu Tsukuda, Kanagawa (JP); Toshiki Hamanishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 18/391,535

(22) Filed: Dec. 20, 2023

(65) Prior Publication Data

US 2024/0209920 A1     Jun. 27, 2024

(30) Foreign Application Priority Data

Dec. 26, 2022    (JP) ................................. 2022-208731

(51) Int. Cl.
| | |
|---|---|
| *B41J 13/00* | (2006.01) |
| *B41J 13/03* | (2006.01) |
| *B65H 5/06* | (2006.01) |
| *F16H 1/20* | (2006.01) |

(Continued)

(52) U.S. Cl.
CPC .............. *F16H 1/20* (2013.01); *B41J 13/009* (2013.01); *B41J 13/03* (2013.01); *B65H 5/06* (2013.01); *F16H 55/06* (2013.01); *B65H 2403/40* (2013.01); *F16H 2055/065* (2013.01); *F16H 57/0427* (2013.01); *F16H 57/0495* (2013.01)

(58) Field of Classification Search
CPC ........ F16H 1/20; F16H 55/06; F16H 57/0427; F16H 57/0495; F16H 2055/065; B41J 13/009; B41J 13/03; B65H 5/06; B65H 2403/40
See application file for complete search history.

(56) References Cited

U.S. PATENT DOCUMENTS

| | | | |
|---|---|---|---|
| 9,169,870 B2 | 10/2015 | Igarashi et al. | ....... F16C 33/107 |
| 9,382,971 B2 | 7/2016 | Sugita et al. | ............. F16H 1/10 |

(Continued)

FOREIGN PATENT DOCUMENTS

| | | | | |
|---|---|---|---|---|
| JP | 2011-174577 | 9/2011 | | |
| JP | 2016-009018 | 1/2016 | | |
| WO | WO-2017032042 A1 * | 3/2017 | ......... | G03G 21/1661 |

*Primary Examiner* — Yaovi M Ameh
(74) *Attorney, Agent, or Firm* — Venable LLP

(57) ABSTRACT

A drive transmission mechanism of a recording apparatus includes a first transmission member that is rotated by a drive force from a drive source, a second transmission member by the drive force from the first transmission member so as to be rotated in a first direction and in a second direction, a third transmission member by the drive force from the second transmission member so as to be rotated, and a support member having a first region that receives a first pressing force from the second transmission member rotated in the first direction and a second region that receives a second pressing force from the second transmission member rotated in the second direction. The support member has grooves disposed on an upstream side of the first region in the first direction and on an upstream side of the second region in the second direction.

11 Claims, 13 Drawing Sheets

(51) Int. Cl.
    *F16H 55/06*           (2006.01)
    *F16H 57/04*           (2010.01)

(56)               References Cited

U.S. PATENT DOCUMENTS

| | | | |
|---|---|---|---|
| 2011/0206438 A1* | 8/2011 | Igarashi | F16C 17/026 |
| | | | 74/414 |
| 2015/0212456 A1* | 7/2015 | Imaizumi | G03G 21/1647 |
| | | | 74/665 G |
| 2023/0415504 A1 | 12/2023 | Abe et al. | B41J 25/00 |
| 2024/0075758 A1 | 3/2024 | Tsukuda et al. | B41J 25/00 |
| 2024/0131857 A1 | 4/2024 | Horita et al. | B41J 13/03 |

* cited by examiner

CONVEYANCE DIRECTION

611

613b    613a         612b
                              612a 614b    614a    621a    621b

DRIVE TRANSMISSION MECHANISM AND RECORDING APPARATUS INCLUDING DRIVE TRANSMISSION MECHANISM

BACKGROUND OF THE INVENTION

Field of the Invention

The present invention relates to a drive transmission mechanism included in an image recording apparatus.

Description of the Related Art

An image recording apparatus that forms (records) an image on a recording material includes a drive transmission mechanism that uses a transmission member such as a gear to transmit power generated from a drive source as a drive to a drive member. The drive transmission mechanism also includes a support member having a fixing shaft that slides while holding the transmission member. To maintain excellent slidability of the transmission member or the fixing shaft, a lubricant such as grease is applied to a sliding portion. In Japanese Patent Application Publication No. 2011-174577, in a sliding portion of a fixing shaft that slides with respect to a transmission member, a groove that holds a lubricant is provided in a region (hereinafter referred to as a biasing region) where the transmission member is biased to the fixing shaft at the time of power transmission to suppress depletion of the lubricant, thereby suppressing abrasion. In Japanese Patent Application Publication No. 2016-009018, at a position facing a biasing region, a groove that holds a lubricant is provided in a fixing shaft so as to suppress abrasion.

SUMMARY OF THE INVENTION

However, in a configuration disclosed in Japanese Patent Application Publication No. 2011-174577, it is concerned that, in the biasing region where the groove portion is provided, a surface pressure locally increases, thereby increasing an amount of abrasion. In a configuration disclosed in Japanese Patent Application Publication No. 2016-009018 also, it is concerned that a change in a rotation direction of a drive source causes a surface pressure locally increase in the biasing region, thereby increasing an amount of abrasion. In addition, there is also a concern that a groove portion provided in a sliding surface of the fixing shaft that slides with respect to a transmission member to extend in a thrust direction increases a stress in a root of the fixing shaft made of a resin, thereby resulting in damage.

An object of the present invention is to provide a technology that can ensure slidability between a transmission member and a support member supporting the transmission member in a drive transmission mechanism and suppress abrasion.

To attain the object described above, a drive transmission mechanism used in a recording apparatus of the present invention includes:

a drive source;

a first transmission member that is rotated by a drive force from the drive source;

a second transmission member that receives the drive force from the first transmission member so as to be rotated in a first direction and in a second direction opposite to the first direction;

a third transmission member that receives the drive force from the second transmission member so as to be rotated; and a support member inserted through a shaft hole of the second transmission member and having an outer peripheral surface, which includes a first region that receives a first pressing force from the second transmission member rotated in the first direction and which includes a second region that receives a second pressing force from the second transmission member rotated in the second direction, wherein the support member has a groove disposed on an upstream side of the first region in the first direction and on an upstream side of the second region in the second direction.

To attain the object described above, a drive transmission mechanism used in the recording apparatus of the present invention includes:

a drive source;

a first transmission member that is rotated by a drive force from the drive source;

a second transmission member that receives the drive force from the first transmission member so as to be rotated in a first direction and in a second direction opposite to the first direction;

a third transmission member that receives the drive force from the second transmission member so as to be rotated; and a support member having a shaft hole through which a rotation shaft of the second transmission member is inserted, the shaft hole having an inner peripheral surface, which includes a first region that receives a first pressing force from the second transmission member rotated in the first direction and which includes a second region that receives a second pressing force from the second transmission member rotated in the second direction, wherein the shaft hole has a groove disposed on an upstream side of the first region in the first direction and on an upstream side of the second region in the second direction.

To attain the object described above, a recording apparatus of the present invention includes:

a recording portion that records an image on a sheet;

a conveying portion that conveys the sheet; and the drive transmission mechanism of the present invention, wherein the drive transmission mechanism transmits a drive force from the conveying portion.

According to the present invention, it is possible to ensure slidability between a transmission member and a support member supporting the transmission member in a drive transmission mechanism and suppress abrasion.

Further features of the present invention will become apparent from the following description of exemplary embodiments with reference to the attached drawings.

DESCRIPTION OF THE EMBODIMENTS

Figure 1:
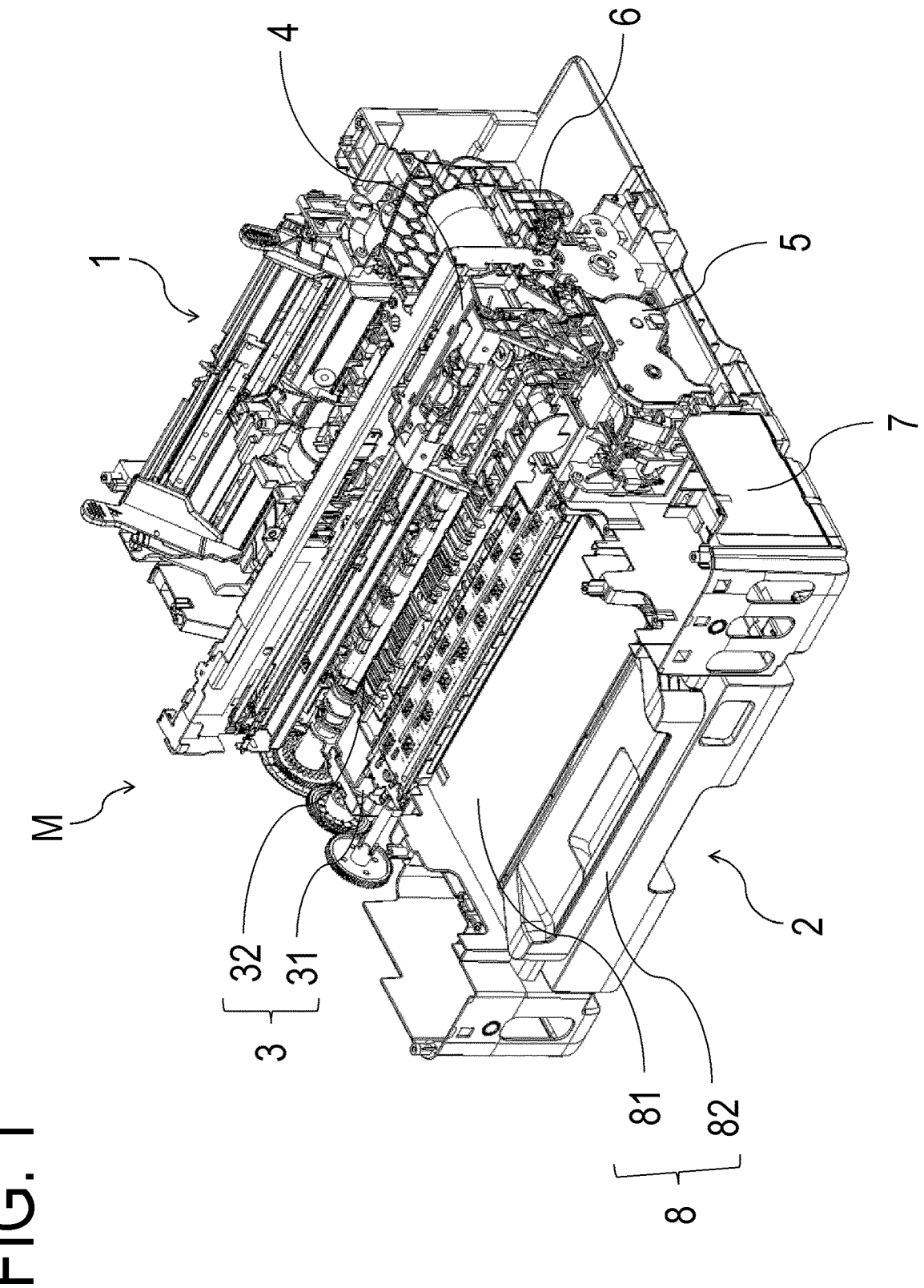
FIG. 1 is a perspective view illustrating a configuration of an image recording apparatus in a first embodiment.

Referring to the drawings, modes for carrying out this invention will be described below in detail by way of example on the basis of each of embodiments. Note that dimensions, materials, shapes, relative positioning, and the like of components described in the embodiment are to be appropriately changed depending on a configuration of an apparatus to which the present invention is applied and various conditions. In addition, not all of the combinations of features described in the present embodiment are indispensable to the means to solve the problems of the present invention. Note that the components described in the embodiment are merely examples, and are not intended to limit the scope of this invention only thereto.

First Embodiment

FIG. 1 is a perspective view illustrating an inner configuration of an image recording apparatus M including a drive transmission mechanism in the present embodiment.

The image recording apparatus according to the present embodiment is an ink jet printer as a liquid-ejection recording apparatus. In other words, the image recording apparatus according to the present embodiment is an apparatus that ejects ink as a recording liquid to a recording medium such as a recording sheet to record an image on the recording medium. Note that the image recording apparatus to which the present invention is applicable is not limited to the recording apparatus described above, and examples thereof also include a laser printer, which is an electrophotographic image recording apparatus (image forming apparatus), and the like.

The image recording apparatus M is a composite machine including a print portion and a scanner portion (not shown) disposed above the print portion, and various processing related to an image recording operation and to a reading operation can be performed individually or in conjunction by the print portion and the scanner portion.

The scanner portion includes an ADF (auto document feeder) and a FBS (flat bed scanner), and can perform reading of a document automatically fed by the ADF and reading (scanning) of the document placed on a document glass of the FBS by a user. Note that the present embodiment is the composite machine having the print portion and the scanner portion in combination, but may also be in a form not including the scanner portion.

The print portion includes the following configuration including a first sheet feeding portion 1 and a second sheet feeding portion 2 on which the user loads the recording medium, a conveying portion 3 that accurately conveys the recording medium fed by each of the sheet feeding portions, a recording portion 4 that records an image on the recording medium conveyed by the conveying portion 3, a sheet discharge portion 8 on which the recording medium having the image recorded thereon and discharged is to be loaded, and the like. The sheet discharge portion 8 includes a recording medium loading portion 81 and an extended tray 82 that can be withdrawn from the image recording apparatus M so as to be able to support the recording medium even when the recoding medium has a large size. The print portion further includes a maintenance portion 5 that performs maintenance of the recording portion 4 and a drive portion 6 that uses a drive from a conveyance motor 31 configured in the conveying portion 3 to switch and transmit the drive to any of the first sheet feeding portion 1, the second sheet feeding portion 2, and the maintenance portion 5. All of these units are connected to a base 7 to configure the print portion.

Figure 2:
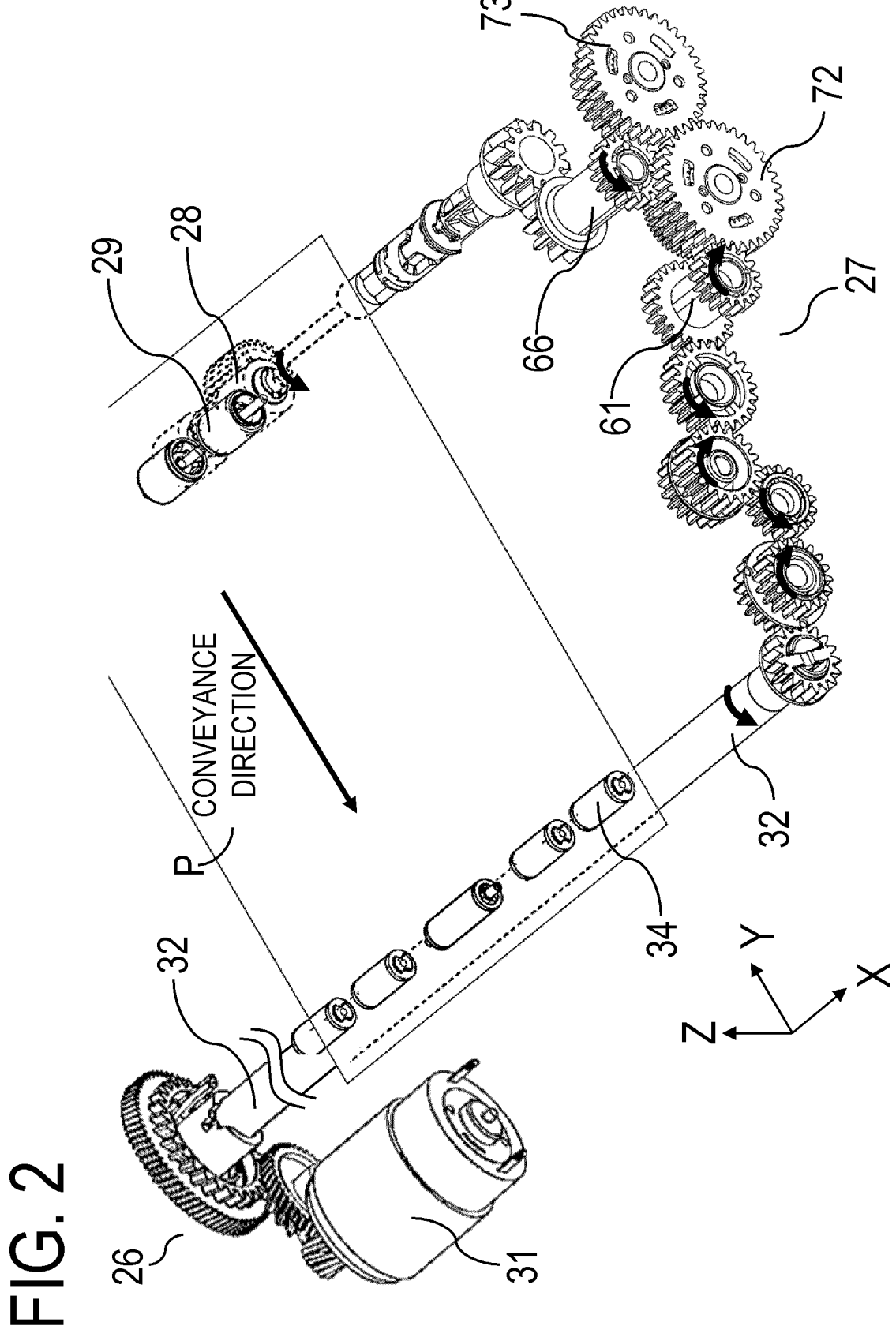
FIG. 2 is a perspective view illustrating a conveying portion of the image recording apparatus in the first embodiment.

FIG. 2 is a perspective view illustrating the conveying portion 3 of the image recording apparatus M in the present embodiment. The conveyance motor 31 as a single drive source is connected (drive-connected) to a conveyance roller 32 via a drive train 26. The conveyance roller 32 can rotate in a direction (hereinbelow referred to as reverse rotation or a reverse rotation direction) reverse to a rotation direction (hereinbelow referred to as normal rotation or a normal rotation direction) in which a sheet P as the recording medium is conveyed in a conveyance direction according to a rotation direction of the conveyance motor 31. An intermediate roller 28 is connected (drive-connected) to the conveyance roller 32 via a drive train 27. Midway in the drive train 27, a unidirectional rotation mechanism described later which includes a combination of a unidirectional clutch 72 and a unidirectional clutch 73 is disposed. Rotation input from an intermediate input gear 61 is passed through the unidirectional rotation mechanism to allow only a drive in the rotation direction illustrated in FIG. 2 to be transmitted to an intermediate roller input gear 66 irrespective of a rotation direction of the intermediate input gear 61. When there is an input to the intermediate roller input gear 66 in the illustrated direction, the intermediate roller 28 rotates in the rotation direction (hereinbelow referred to as the normal rotation) illustrated in FIG. 2 in which the sheet P is conveyed in the conveyance direction.

Figure 3A:
FIGS. 3A to 3D are diagrams each illustrating a registration adjustment operation in the image recording apparatus in the first embodiment.
Figure 3A:
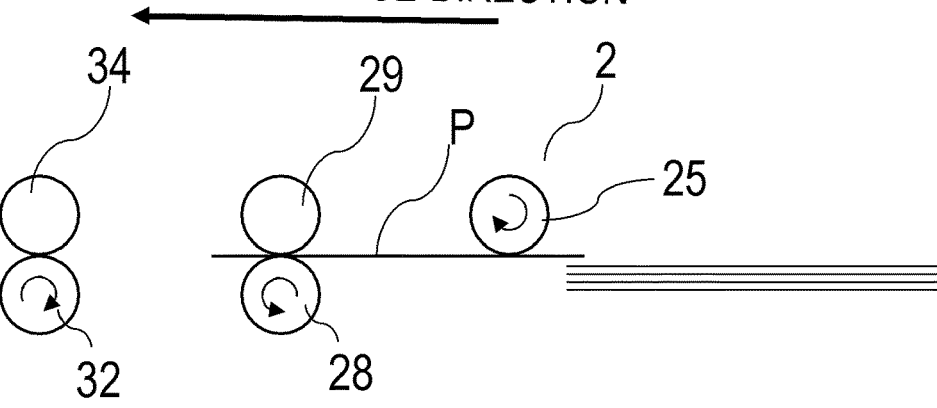
Figure 3B:
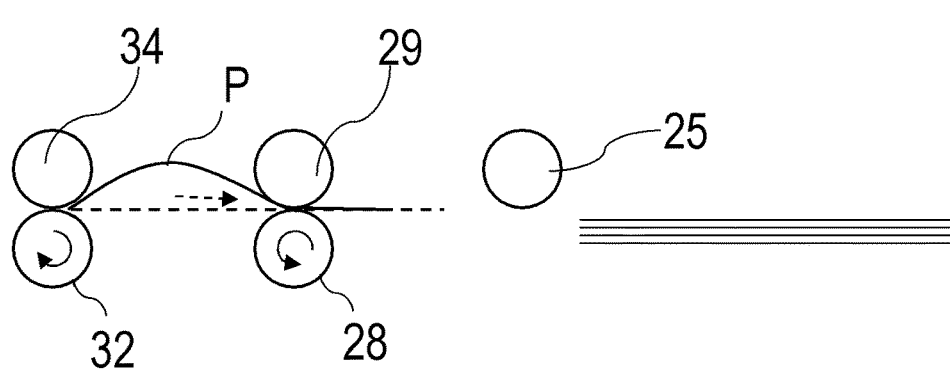

FIGS. 3A to 3D are diagrams illustrating a registration adjustment operation in the image recording apparatus M in the present embodiment. As illustrated in FIG. 3A, the sheet P fed by the sheet feeding roller 25 provided in the sheet feeding portion 2 is conveyed in the conveyance direction by rotation of a roller pair including the intermediate roller 28 and a driven roller 29 that receives a biasing force to come into contact with the intermediate roller 28. At this time, the conveyance roller 32 (second roller) is reversely rotated, while the intermediate roller 28 (first roller) is normally rotated. When the conveyance of the sheet P proceeds and a leading end of the sheet P reaches the conveyance roller 32, due to the reverse rotation of the conveyance roller 32, the leading end of the sheet P cannot advance on a downstream side of the conveyance roller 32 in the conveyance direction to be stopped by the conveyance roller 32 and a pinch roller 34. Meanwhile, since the intermediate roller 28 tends to convey the sheet P in the conveyance direction, as illustrated in FIG. 3B, the sheet P forms a loop. As a result, even when left and right leading end portions of the sheet P reach the conveyance roller 32 with different timings, it is possible to align respective positions of the left and right leading end portions.

Figure 3C:
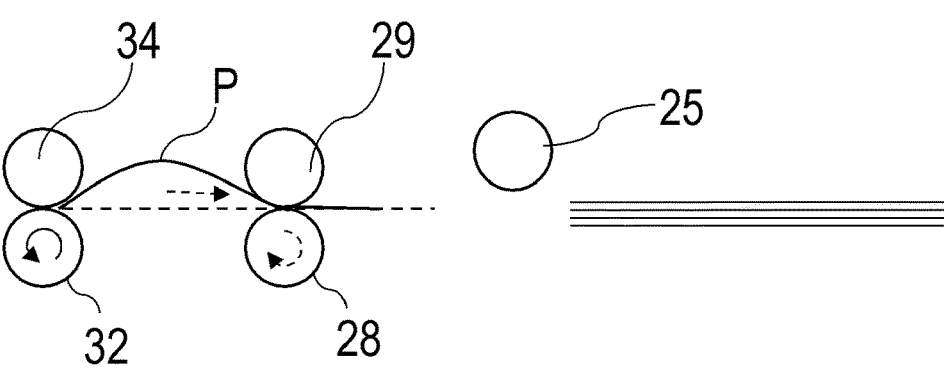

After the loop is formed and the positions of the left and right leading end portions of the sheet P are aligned, as illustrated in FIG. 3C, the rotation direction of the convey-ance roller 32 is changed. At this time, the drive to the intermediate roller 28 is temporarily cut off, backlash of the drive trains, transmission delays in the unidirectional clutches, and the like are consumed, and then the drive is connected again.

However, when the loop has been formed, a force to eliminate the loop acts on the sheet P, and consequently the intermediate roller 28 receives, from the sheet P, a force in a direction that reversely rotates the intermediate roller 28. At this time, when the intermediate roller 28 is reversely rotated, the loop is eliminated, and a problem occurs in that the left and right leading ends that have been aligned once are misaligned again. Therefore, in conveyance after the left and right leading end portions of the sheet P are aligned, it is important to prevent reverse rotation of the intermediate roller 28 and hold the loop until the conveyance by the conveyance roller 32 is started.

In the present embodiment, when the intermediate roller 28 tends to reversely rotate, the reverse rotation of the intermediate roller 28 is prevented using an action of a restricting gear not shown. Thus, even when the drive to the intermediate roller 28 is cut off, it is possible to hold the loop of the sheet P.

Figure 3D:
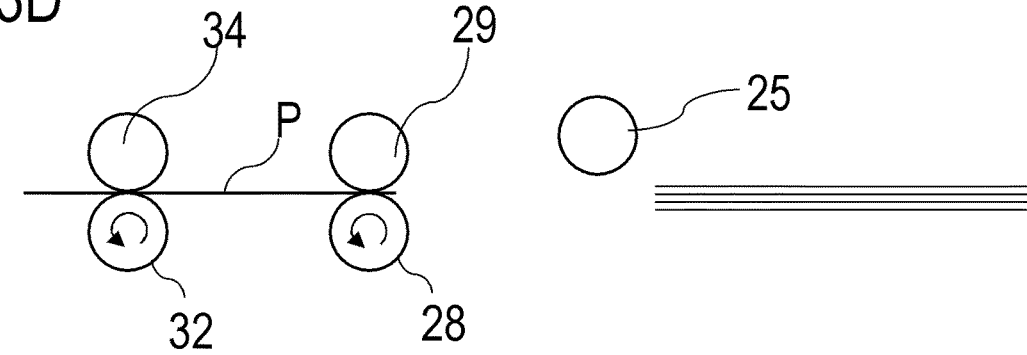

As illustrated in FIG. 3D, when the conveyance of the sheet P is started by the conveyance roller 32 to reconnect the drive to the intermediate roller 28, the action of a restricting gear 69 not shown is cancelled, and the rotation of the intermediate roller 28 is no longer inhibited. In addition, by setting a roller peripheral velocity of the con-veyance roller 32 higher than a roller peripheral velocity of the intermediate roller 28, when the conveyance of the sheet proceeds, deflection of the sheet is naturally eliminated, and it is possible to inhibit a reaction force resulting from the deflection from preventing sheet conveyance.

With the configuration described above, it is possible to prevent the reverse rotation of the intermediate roller 28 due to the reaction force generated during registration adjust-ment of the sheet P without using a biasing means such as a spring.

Figure 4:
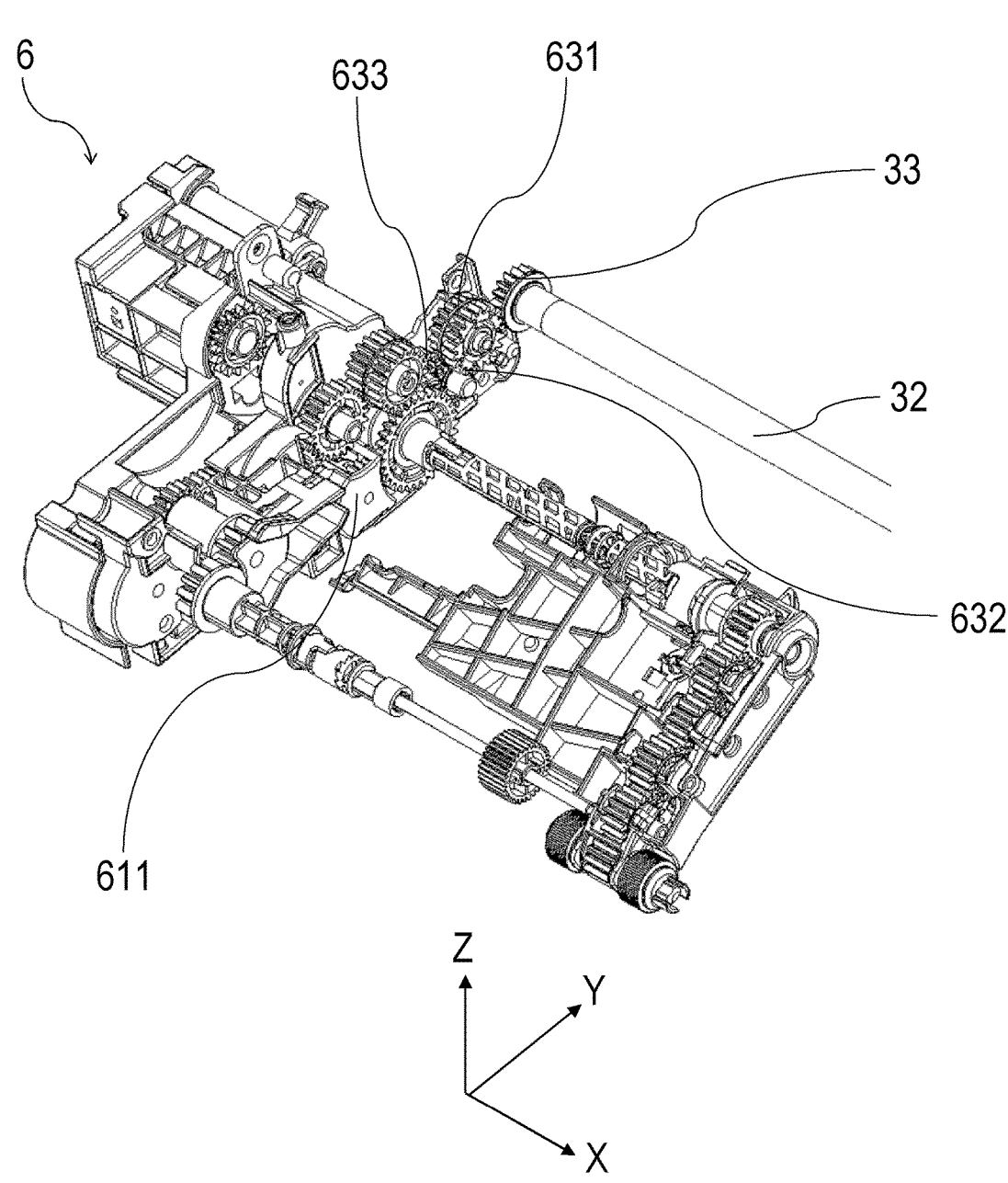
FIG. 4 is a perspective view illustrating a configuration of a drive member in the first embodiment.

FIG. 4 is a perspective view illustrating the drive portion 6 of the image recording apparatus M in the present embodi-ment. The drive from the conveyance motor 31 serving as the drive source is transmitted to the drive portion 6 via a conveyance roller output gear 33 that rotates integrally with the conveyance roller 32. In other words, to a drive trans-mission mechanism 60 included in the drive portion 6 and described later, a drive force from the conveyance motor 31 serving as the drive source is transmitted via the conveying portion 3 including the conveyance roller 32 and the con-veyance roller output gear 33. The drive portion 6 includes, as the drive transmission mechanism 60, a transmission member 631 that meshes with the conveyance roller output gear 33 as well as a transmission member 632 and a transmission member 633, and transmits the drive to each of the drive portions such as the first sheet feeding portion 1 and the second sheet feeding portion 2 via the transmission members 631 to 633. The drive portion 6 also includes a base 611 having a plurality of fixing shafts that hold various gears such as the transmission member 631 and slide.

Figure 5A:
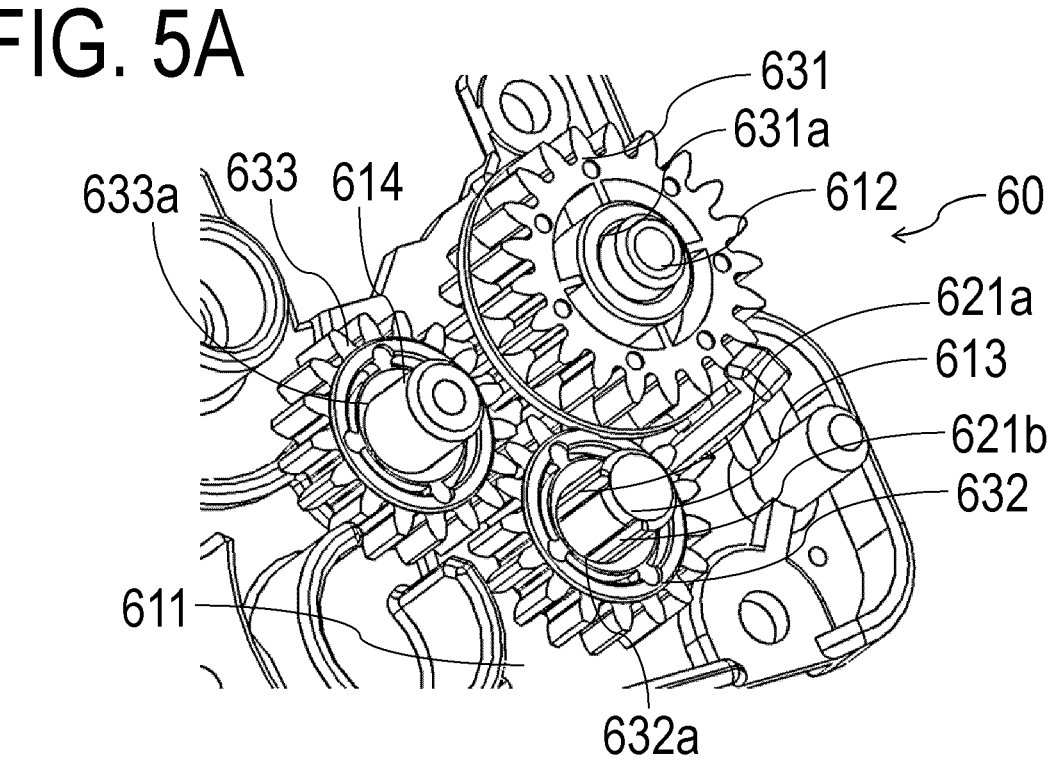
FIGS. 5A and 5B are perspective views each illustrating a configuration of a drive transmission mechanism in the first embodiment.
Figure 5B:
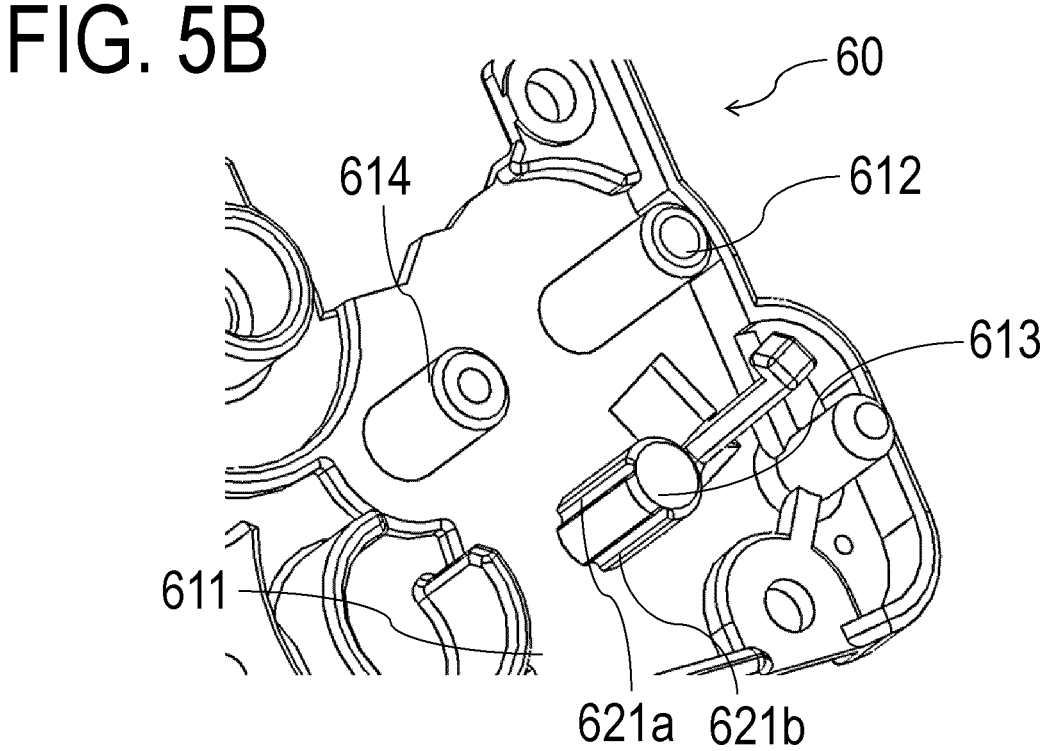
Figure 6:
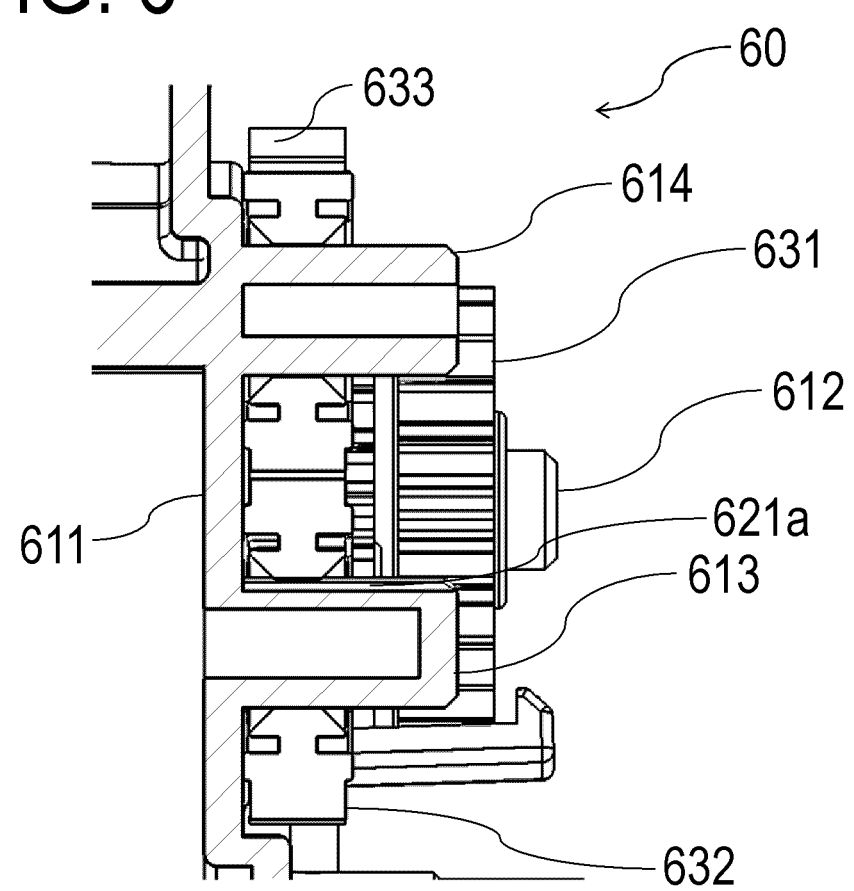
FIG. 6 is a cross-sectional view illustrating the configuration of the drive transmission mechanism in the first embodiment.

FIG. 5A is a perspective view illustrating a part of the drive transmission mechanism 60 in the present embodi-ment, FIG. 5B illustrates the fixing shafts from which the transmission members held by the base 611 have been removed, and FIG. 6 illustrates cross sections of the fixing shafts. The drive transmission mechanism 60 includes the first transmission member 631, the second transmission member 632, and the third transmission member 633, which are the gears. The first transmission member 631 receives the drive force transmitted from the conveyance motor 31 serving as the drive source to rotate. The second transmis-sion member 632 receives the drive force from the first transmission member 631 to rotate. The third transmission member 633 receives the drive force from the second transmission member 632 to rotate. The drive transmission mechanism 60 transmits the drive to each of the drive portions via the first transmission member 631, the second transmission member 632, and the third transmission mem-ber 633. In addition, the drive transmission mechanism 60 includes, as respective support members which rotatably support the transmission members 631 to 633, a first fixing shaft 612, a second fixing shaft 613, and a third fixing shaft 614 which serve as support shafts as well as the base 611 that supports the fixing shafts.

The first transmission member 631, the second transmis-sion member 632, and the third transmission member 633 are respectively provided with a shaft hole 631a, a shaft hole 632a, and a shaft hole 633a. Through the shaft holes 631a, 632a, and 633a, the first fixing shaft 612, the second fixing shaft 613, and the third fixing shaft 614 are respectively inserted to allow the first transmission member 631, the second transmission member 632, and the third transmission member 633 to interfit with the individual fixing shafts and be rotatably held. Interfitting portions between the shaft hole 631a, the shaft hole 632a, and the shaft hole 633a and the first fixing shaft 612, the second fixing shaft 613, and the third fixing shaft 614 have diameter differences of, e.g., 5 μm to 100 μm therebetween.

In an outer peripheral surface of the second fixing shaft 613, a first groove portion 621a and a second groove portion 621b are provided to each extend throughout a substantially entire region in a thrust direction along the thrust direction and hold a lubricant. It is desirable that the first groove portion 621a and the second groove portion 621b are provided to extend over a distance of not less than a length over which the second transmission member 632 and the second fixing shaft 613 slide in the thrust direction (direction along an axis line of the second fixing shaft 613 or a rotation axis line of the second transmission member 632).

Note that not all of the three fixing shafts necessarily need to be configured to be supported by the one base 611. In other words, the base 611 needs only to include at least the second fixing shaft 613, and the first fixing shaft 612 and the third fixing shaft 614 may also be provided in another component.

A detailed description will be given of functions and effects of the embodiment of the present invention.

Figure 7A:
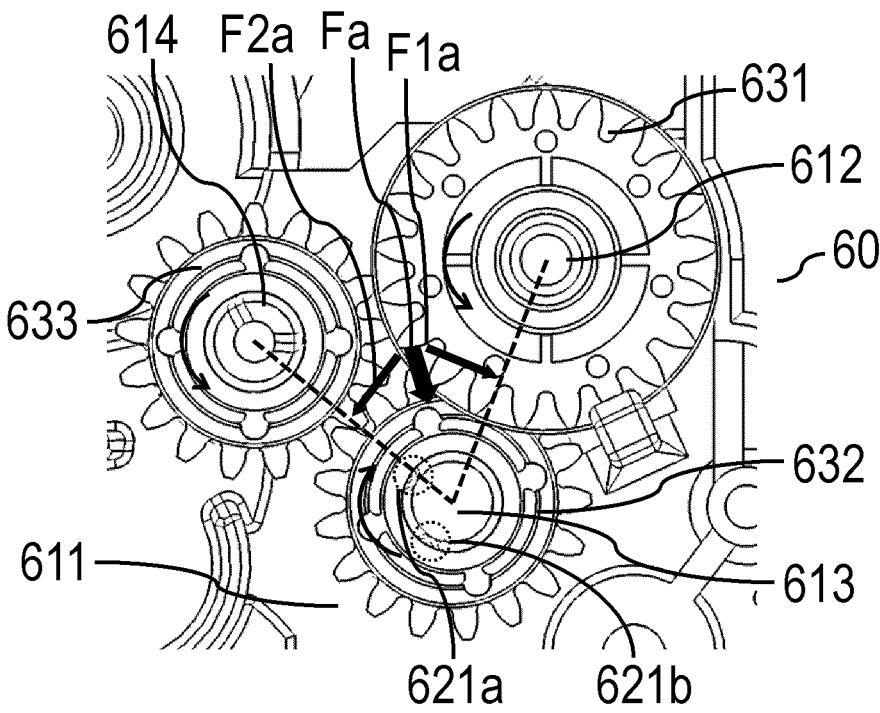
FIGS. 7A and 7B are front views each illustrating an operation of the drive transmission mechanism in the first embodiment.
Figure 7B:
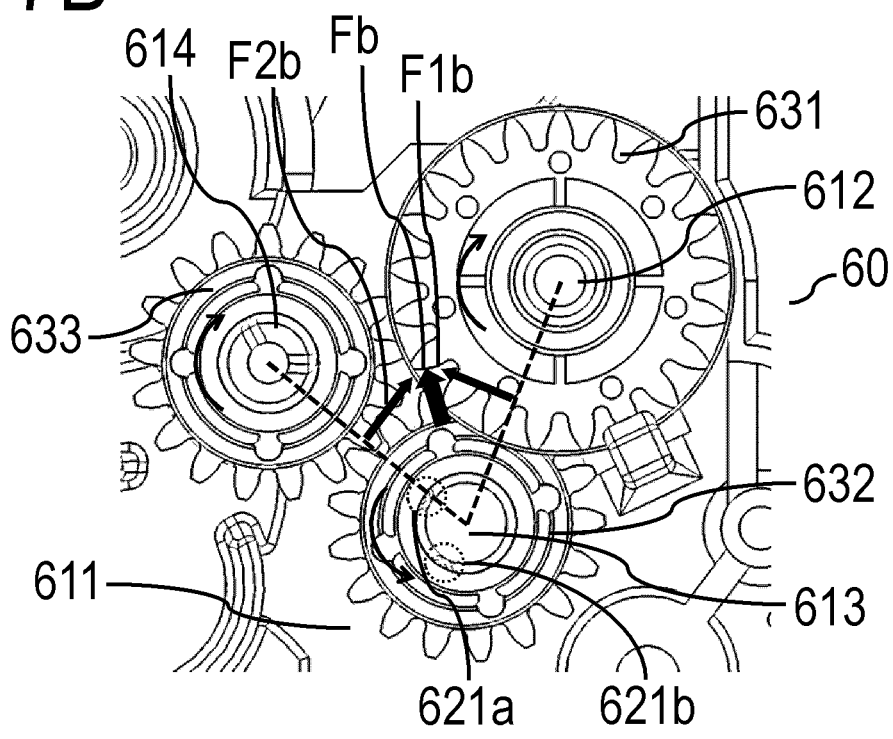

FIG. 7A illustrates orientations of forces acting on the second transmission member 632 and a position relationship between the first groove portion 621a and the second groove portion 621*b* each provided in the second fixing shaft 613 when a drive force in a first rotation direction (first direction) is transmitted from the conveyance motor 31 to the first transmission member 631. FIG. 7B illustrates orientations of forces acting on the second transmission member 632 and the positional relationship between the first groove portion 621*a* and the second groove portion 621*b* each provided in the second fixing shaft 613 when a drive force in a second rotation direction (second direction) is transmitted from the conveyance motor 31 to the first transmission member 631. The first rotation direction and the second rotation direction are reverse to each other.

As illustrated in FIGS. 7A and 7B, the first transmission member 631, the second transmission member 632, and the third transmission member 633 rotate in respective arrow directions indicated by curved lines in the drawings to transmit power from the conveyance motor 31. A case where the drive force in the first direction is transmitted from the conveyance motor 31 is a case where the conveyance roller 32 is reversely rotated as illustrated in, e.g., FIGS. 3A and 3B or the like. Meanwhile, a case where the drive force in the second direction is transmitted from the conveyance motor 31 is a case where the conveyance roller 32 is normally rotated as illustrated in, e.g., FIGS. 3C and 3D.

When the transmitted drive force is in the first rotation direction, as illustrated in FIG. 7A, the second transmission member 632 receives a first force Fa corresponding to a resultant force of a force F1*a* received from the first transmission member 631 and a force F2*a* received from the third transmission member 633 to be biased toward the second fixing shaft 613. When the transmitted drive force is in the second direction, as illustrated in FIG. 7B, the second transmission member 632 receives a second force Fb corresponding to a resultant force of a force F1*b* from the first transmission member 631 and a force F2*b* from the third transmission member 633 to be biased toward the second fixing shaft 613. The second force Fb illustrated in FIG. 7B acts on the second transmission member 632 in a direction reverse to that of the first force Fa in a phase shifted by 180 degrees with respect to that of the first force Fa illustrated in FIG. 7A around the axis line of the second fixing shaft 613 to bias the second transmission member 632 to the second fixing shaft 613. Thus, a direction of the first force Fa serving as a first pressing force and a direction of the second force Fb serving as a second pressing force are determined only by respective locations of the first transmission member 631 and the third transmission member 633 with respect to the second transmission member 632 and a rotation direction of the drive source.

Figure 8A:
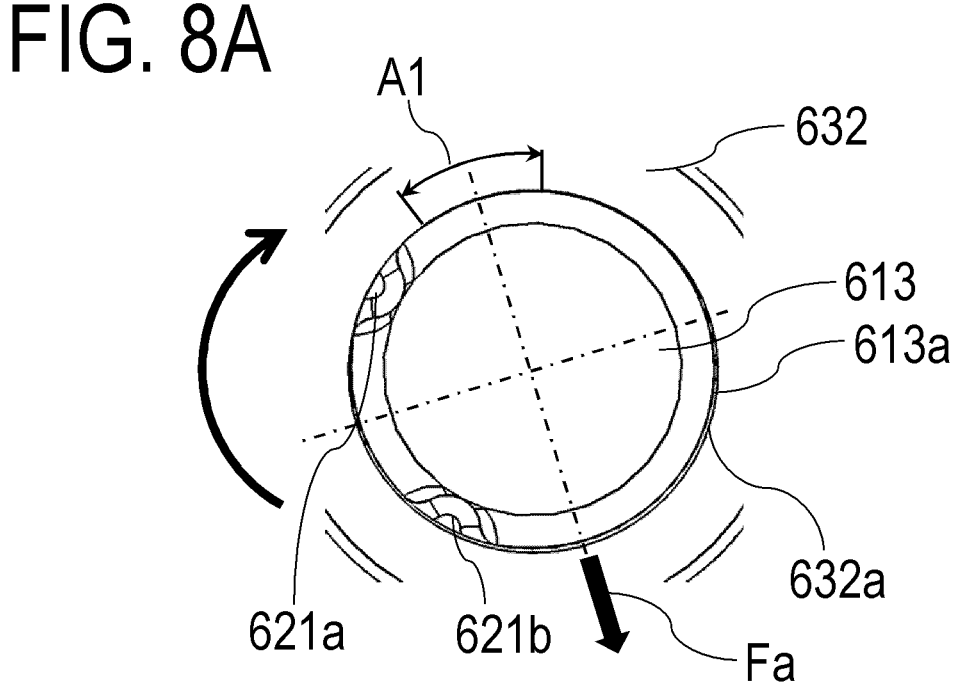
FIGS. 8A and 8B are enlarged views illustrating the operation of the drive transmission mechanism in the first embodiment.
Figure 8B:
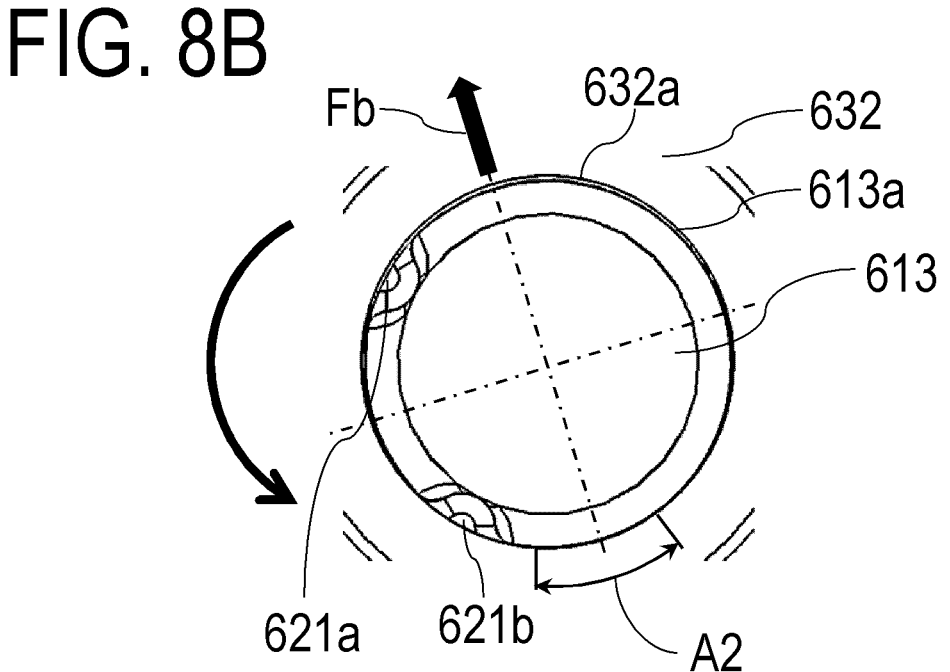

FIG. 8A is a schematic enlarged view of an interfitting portion between the shaft hole 632*a* of the second transmission member 632 and the second fixing shaft 613 when the drive force in the first rotation direction from the conveyance motor 31 is transmitted to the first transmission member 631. FIG. 8B is a schematic enlarged view of the interfitting portion between the shaft hole 632*a* of the second transmission member 632 and the second fixing shaft 613 when the drive force in the second rotation direction is transmitted from the conveyance motor 31 to the first transmission member 631.

When the drive force transmitted from the conveyance motor 31 is in the first rotation direction, as illustrated in FIG. 8A, the second transmission member 632 receives the first force Fa to be biased to the second fixing shaft 613 in a first sliding region (first region) A1. When the drive force transmitted from the conveyance motor 31 is in the second rotation direction, as illustrated in FIG. 8B, the second transmission member 632 receives the second force Fb to be biased to the second fixing shaft 613 in a second sliding region (second region) A2. The first groove portion 621*a* is provided on an upstream side of the first sliding region A1 in the first rotation direction in an outer peripheral surface of the second fixing shaft 613 so as to avoid the first sliding region A1. Meanwhile, the second groove portion 621*b* is provided on an upstream side of the second sliding region A2 in the second rotation direction in the outer peripheral surface of the second fixing shaft 613 so as to avoid the second sliding region A2.

A description will be given herein of a sliding region. When a strong force in a predetermined direction (third direction) is applied to the second transmission member 632, relative positions of the shaft hole 632*a* and the second fixing shaft 613 slightly change to be offset (decentered) in a direction (fourth direction) reverse to the predetermined direction described above in a tolerance range of an annular gap between the shaft hole 632*a* and the second fixing shaft 613 (between facing surfaces). The slight change of the relative positions relatively reduces spacing of the annular gap between an inner peripheral surface of the shaft hole 632*a* and the outer peripheral surface of the second fixing shaft 613 in a region on the upstream side in the predetermined direction described above and, in such a region, a state is established in which the shaft hole 632*a* and the second fixing shaft 613 are strongly pressed against each other. Generation of such locally strong pressing forces may involve slight deformation of the shaft hole 632*a* and the second fixing shaft 613. In the present embodiment, a region where these locally strong pressing forces are generated is referred to as the sliding region. Note that, between the shaft hole 632*a* and the second fixing shaft 613, the lubricant is interposed and consequently, in such a sliding region also, the shaft hole 632*a* and the second fixing shaft 613 do not normally come into direct contact with each other and slide.

A range of the sliding region is hard to clearly define but, e.g., a predetermined range in both directions around the inner peripheral surface of the shaft hole 632*a* or around the outer peripheral surface of the second fixing shaft 613 around a root of a vector of the first force Fa illustrated in FIG. 8A may appropriately be set as the range of the sliding region. A position of this vector can be defined on the basis of positional relationships between respective shaft centers the first fixing shaft 612, the second fixing shaft 613, and the third fixing shaft 614, as illustrated in FIG. 7A. As the predetermined range, for example, a range in which a pressing force, which is higher by a certain degree than a reduced pressing force in an opposite region, is observed may also be set as the range of the sliding region. The same applies also to the second force Fb illustrated in FIG. 8B.

Due to the foregoing configuration, biasing regions where the transmission members are biased to the fixing shaft and the groove portions do not overlap each other in phase around the axis lines of the fixing shafts irrespective of the rotation direction of the drive source. As a result, sliding areas between the transmission members and the fixing shafts are ensured, and surface pressures between the transmission members and the fixing shafts are not increased, and therefore it is possible to suppress a rise of friction heat and abrasion. In addition, since the lubricant can be supplied from the groove portions provided in the vicinity of the biasing region, it is possible to maintain excellent slidability.

By contrast, in a configuration described in Japanese Patent Application Publication No. 2011-174577, a groove portion is provided in a biasing region of a sliding portion of a fixing shaft. Accordingly, a contact area between a transmission member and a fixing shaft decreases in the biasing region, and a surface pressure placed on the transmission member or on the fixing shaft increases. As a result, friction heat resulting from the sliding of the transmission member or the fixing shaft increases to increase an amount of abrasion. Additionally, in a configuration described in Japanese Patent Application Publication No. 2016-009018 also, when a drive source rotates in a second direction different from a first rotation direction, a biasing region moves to a position (phase) overlapping a groove portion provided in a fixing shaft. Accordingly, the contact area between the transmission member and the fixing shaft decreases, and the surface pressure placed on the transmission member or on the fixing shaft increases. As a result, friction heat resulting from sliding of the transmission member or the fixing shaft increases to increase an amount of abrasion.

In the present embodiment, the two groove portions are provided, but it may also be possible to provide one groove portion or a plurality of three or more groove portions.

Also, in the present embodiment, the groove portions are provided in the vicinity of a phase shifted by 45 degrees on an upstream side of a center of the sliding region (root of the vector) in the rotation direction, but the groove portions are not limited to such a configuration. In other words, the groove portions may optionally be provided within a phase range which is larger than 0 degrees and less than 180 degrees on the upstream side of the center of the sliding region in the rotation direction and does not overlap the sliding region.

It is desirable that, in the outer peripheral surface of the fixing shaft, a boundary between each of the groove portions and a sliding surface (outer peripheral surface) has a smooth curved shape. This reduces catching between the fixing shaft and the sliding transmission member and allows excellent slidability to be maintained.

Second Embodiment

Figure 9A:
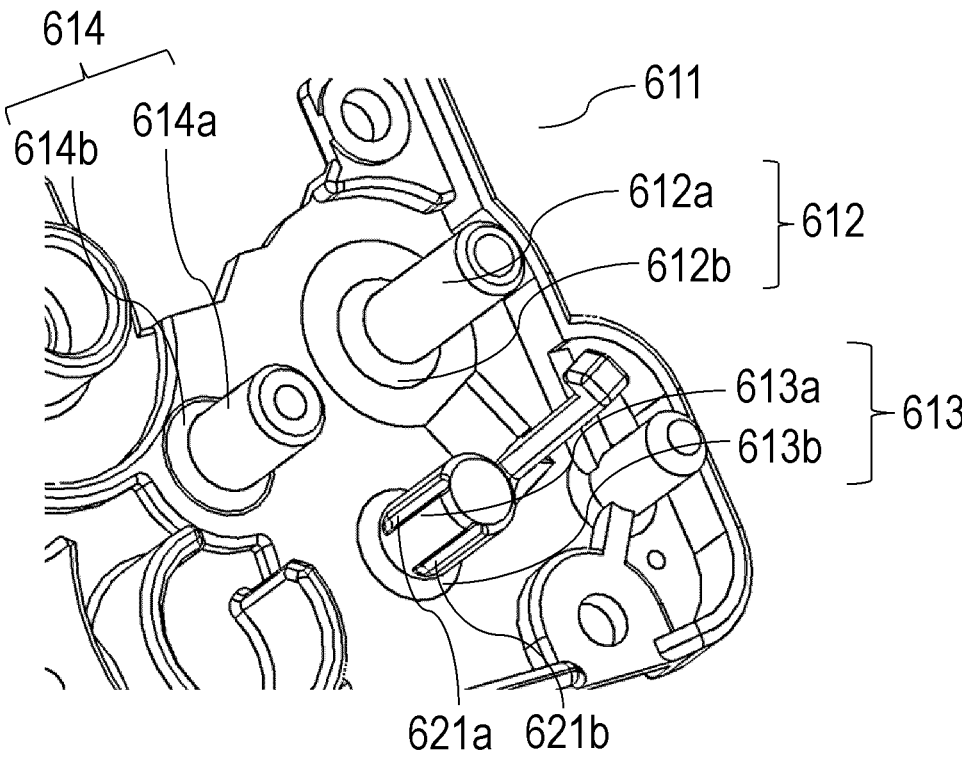
FIGS. 9A and 9B are perspective view and a cross sectional view each illustrating a configuration of a drive transmission mechanism in a second embodiment.
Figure 9B:
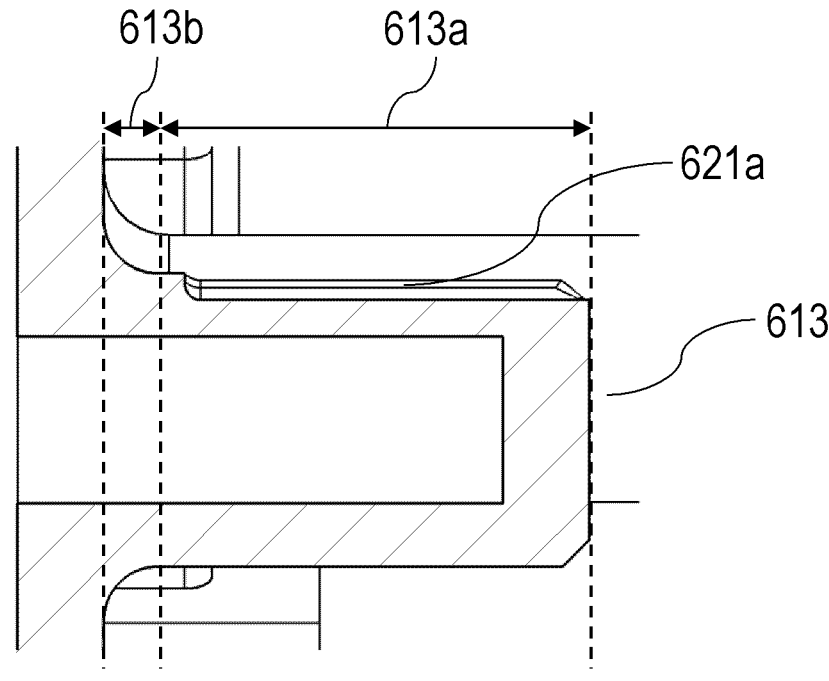
Figure 10:
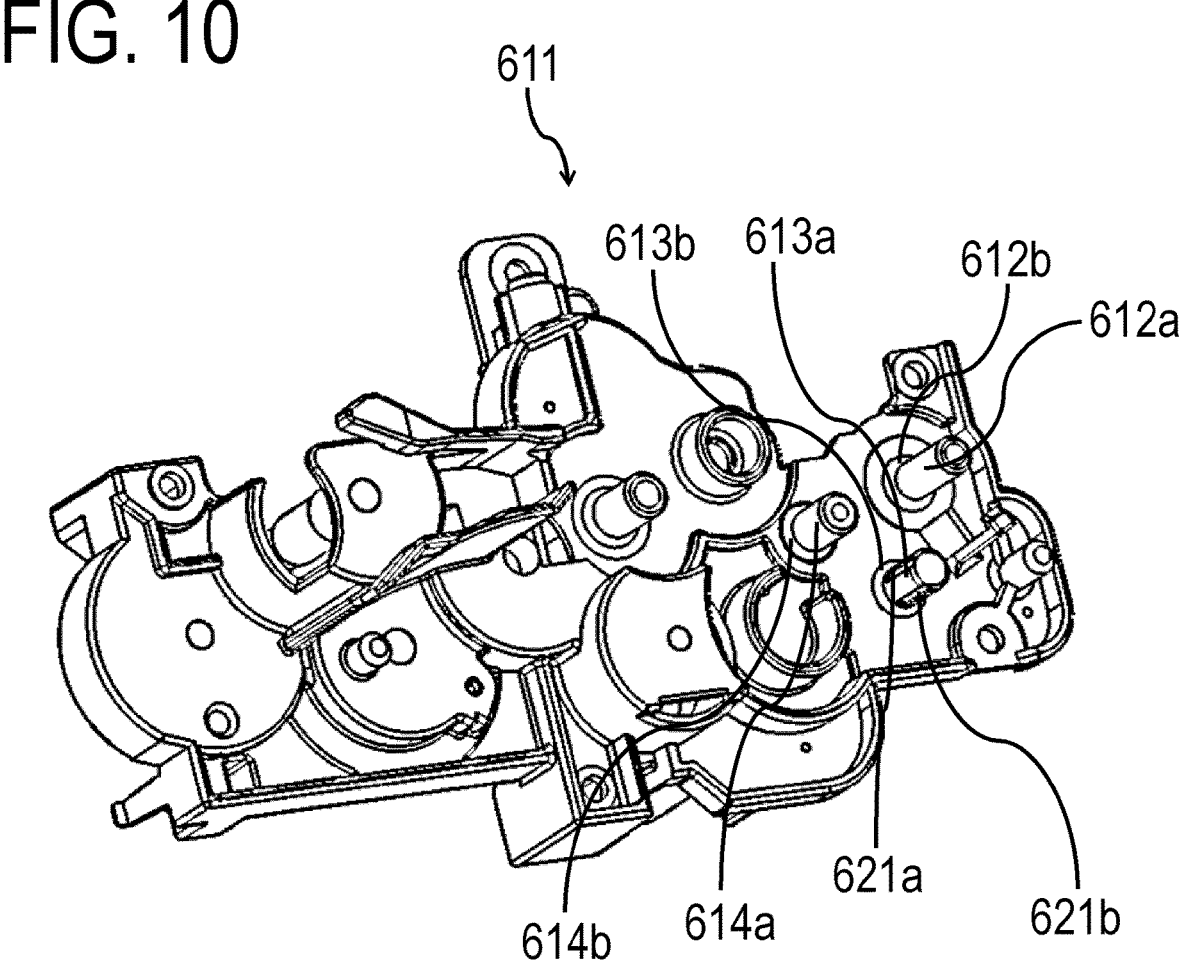
FIG. 10 is a perspective view illustrating a configuration of a base in the second embodiment.

Referring to FIGS. 9A to 10, a description will be given of a drive transmission mechanism according to the second embodiment of the present invention. Note that, in the second embodiment, a description of configurations common to those in the first embodiment is omitted by assigning the same reference sings as those in the first embodiment. In the second embodiment, matters not particularly described herein are the same as those in the first embodiment.

FIG. 9A is a perspective view illustrating locations of the first groove portion 621a and the second groove portions 621b each provided in the second fixing shaft 613 in the thrust direction. FIG. 9B is a cross-sectional view of the second fixing shaft 613.

The first fixing shaft 612, the second fixing shaft 613, and the third fixing shaft 614 respectively have an outer peripheral surface 612a, an outer peripheral surface 613a, and an outer peripheral surface 614a serving as leading-end-side first peripheral surfaces which slide with the shaft hole 631a, the shafts hole 632a, and the shaft hole 633a. In addition, between the individual outer peripheral surfaces 612a, 613a, and 614a and the base 611, a tapered surface 612b, a tapered surface 613b, and a tapered surface 614b serving as fixing-shaft-root-side second peripheral surfaces different from the first peripheral surfaces are provided. Meanwhile, in the outer peripheral surface 613a of the second fixing shaft 613, the first groove portion 621a and the second groove portion 621b each serving as a lubrication groove that holds the lubricant are provided so as to extend in the thrust direction.

Each of the tapered surfaces 612b to 614b is configured to have a recessed curved surface. In other words, the tapered surfaces 612b to 614b are configured to extend from the outer peripheral surfaces 612a to 614a toward the base 611 so as to gradually increase in diameter and have diameters (second diameters) larger than diameters (first diameters) of the outer peripheral surfaces 612a to 614a at boundaries with the base 611. With such a configuration, the tapered surfaces 612b to 614b reduce stresses placed on roots of the individual fixing shafts 612 to 614 corresponding to joints with the base 611.

Additionally, by providing the first groove portion 621a and the second groove portion 621b only in the outer peripheral surface 613a of the second fixing shaft 613, an effect on the stress placed on the root of the second fixing shaft 613 due to the provision of the first groove portion 621a and the second groove portion 621b is reduced. Consequently, it is possible to inhibit damage the second fixing shaft 613 caused by a reduced strength thereof due to the first groove portion 621a and the second groove portion 621b.

The foregoing configuration allows the base 611, the first fixing shaft 612, the second fixing shaft 613, and the third fixing shaft 614 to use a polymer material (e.g., a resin material) having a strength lower than that of metal. Thus, it is possible to ensure a sufficient strength even when the base 611 and the fixing shaft including the groove portions are integrally molded using the polymer material and provide a drive transmission mechanism that is inexpensive and highly productive, and can suppress abrasion.

FIG. 10 is a perspective view illustrating an outer appearance of the base 611 integrally molded with the first fixing shaft 612, the second fixing shaft 613, and the third fixing shaft 614 in the present embodiment. As a polymer material to be used, ABS (acrylonitrile butadiene styrene), a reinforcing material containing glass fiber or the like, or a crystalline resin material such as POM (polyacetal) or PBT (polybutylene terephthalate) is generally preferred. However, a preferable material depends on a condition or an environment in which the material is used, and accordingly a material other than the materials shown herein may also be used.

Note that a shape for holding the lubricant is not limited to a shape such as that of a groove portion, and may also be a D-shape such as obtained by partially cutting off a sliding surface of a fixing shaft. In the present embodiment, the present invention is applied to the drive member of the image recording apparatus, but an application target is not limited thereto, and the present invention may also be applied to another apparatus including the drive transmission mechanism.

Third Embodiment

Figure 11:
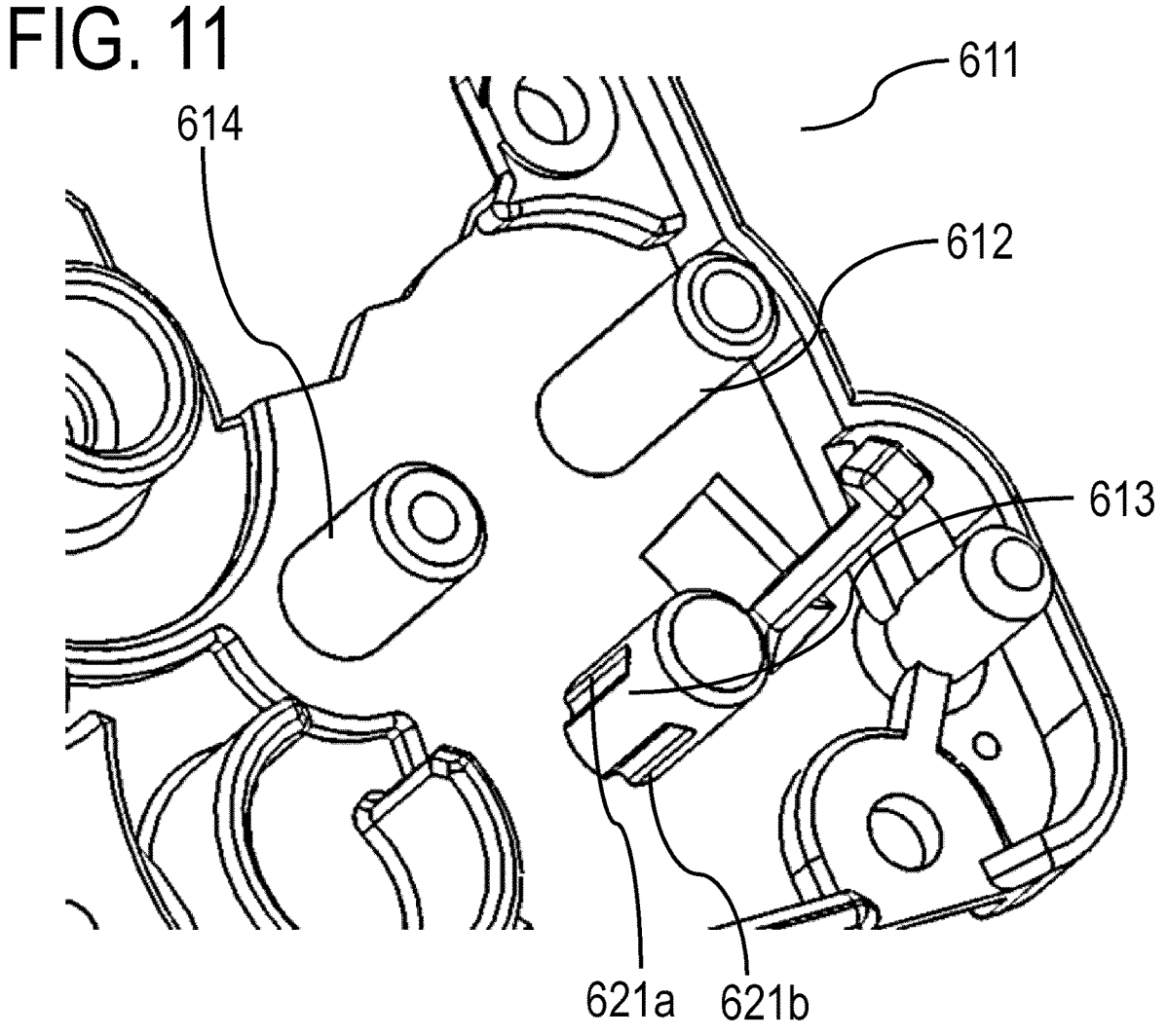
FIG. 11 is a perspective view illustrating a configuration of a drive transmission mechanism in a third embodiment.

Referring to FIG. 11, a description will be given of a drive transmission mechanism according to the third embodiment of the present invention. FIG. 11 is a perspective view illustrating a configuration of a drive transmission mechanism in the third embodiment.

Note that, in the third embodiment, a description of configurations common to those in the embodiments described above is omitted by assigning the same reference sings as those in the embodiments described above. In the third embodiment, matters not particularly described herein are the same as those in the embodiments described above.

In the first embodiment, the groove portions are provided in substantially the entire region of the sliding surface (outer peripheral surface) of the second fixing shaft 613 in the thrust direction, but a range in which the groove portions are formed is not limited thereto. As illustrated in FIG. 11, the range in which the groove portions are formed needs only to have a width of not less than a width of a sliding region for each of the second transmission member 632 and the second fixing shaft 613 in the thrust direction. In other words, as long as the groove portions are provided in a range including the first sliding region A1 and the second sliding region A2 in a rotation axis line direction of the second transmission member 632, the groove portions need not be extended throughout the entire region of the outer peripheral surface of the second fixing shaft 613 in the thrust direction, unlike in the first embodiment. According to the present embodiment, it is possible to inhibit the lubricant held in the groove portions from flowing out in the thrust direction.

Fourth Embodiment

Figure 12A:
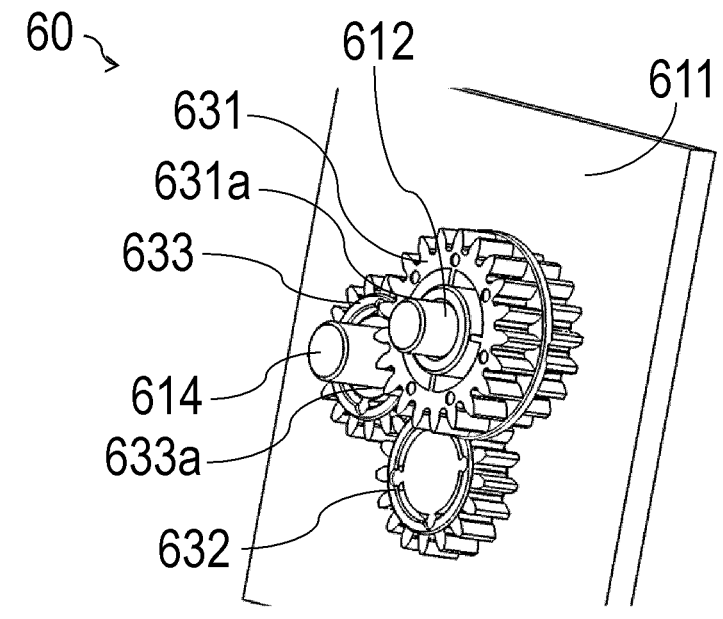
FIGS. 12A and 12B are perspective views each illustrating a configuration of a drive transmission mechanism in a fourth embodiment.
Figure 12B:
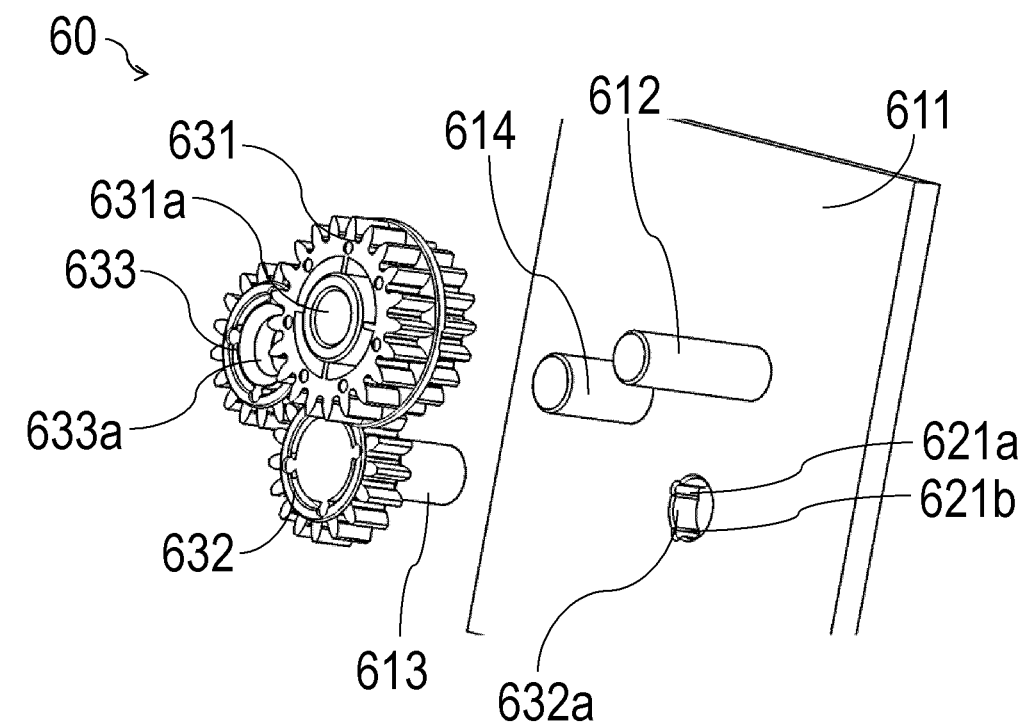
Figure 13:
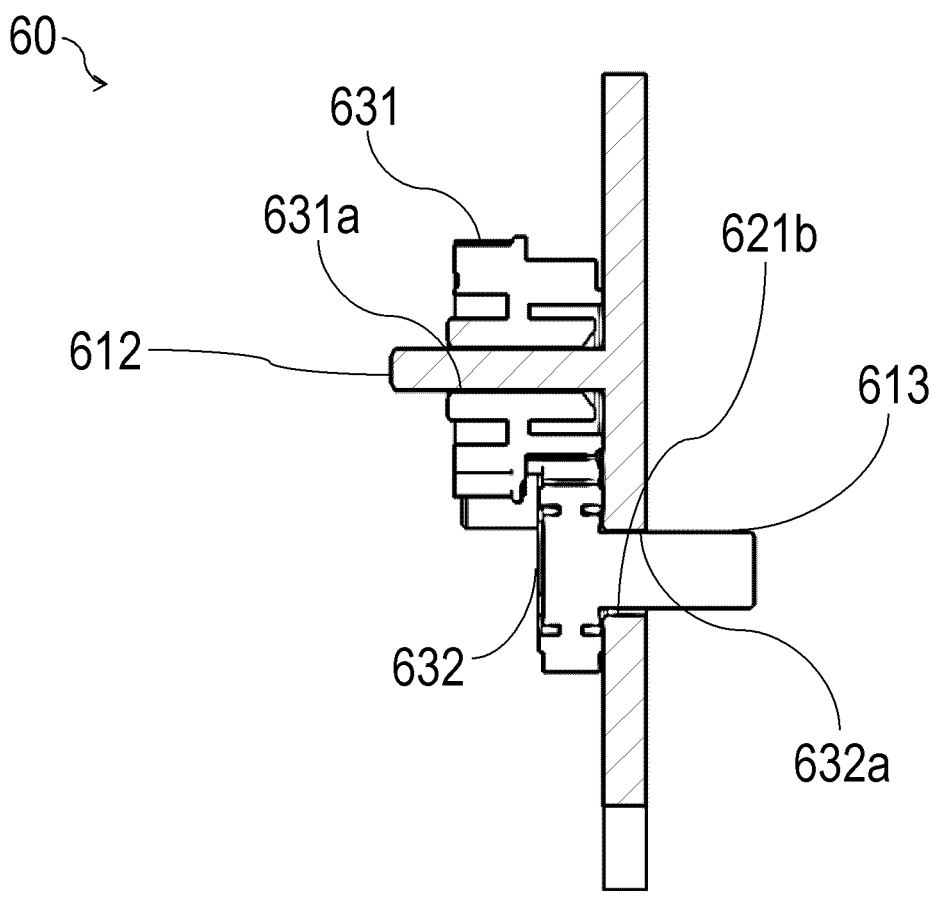
FIG. 13 is a cross-sectional view illustrating the configuration of the drive transmission mechanism in the fourth embodiment.

Referring to FIGS. 12A to 13, a description will be given of a drive transmission mechanism according to the fourth embodiment of the present invention. FIG. 12A is a perspective view of the drive transmission mechanism 60 in the present embodiment. FIG. 12B is an exploded view of the drive transmission mechanism 60 in the present embodiment. FIG. 13 is a cross-sectional view of the drive transmission mechanism 60 in the present embodiment.

Note that, in the fourth embodiment, a description of configurations common to those in the embodiments described above is omitted by assigning the same reference sings as those in the embodiments described above. In the fourth embodiment, matters not particularly described herein are the same as those in the embodiments described above.

As illustrated in FIGS. 12A to 13, in the present embodiment, the second transmission member 632 is provided with the second fixing shaft 613. In addition, the base 611 is provided with the shaft hole 632*a*, the first groove portion 621*a*, and the second groove portion 621*b*. According to the present embodiment, no groove portion is provided in the second fixing shaft 613, and therefore it is possible to inhibit a reduced strength of the second fixing shaft 613. Note that, in the present embodiment, the second transmission member 632 may also be an integrally molded product of the gear portion and the fixing shaft using the polymer material mentioned above.

In each of the embodiments described above, the first transmission member 631 may also be a gear that is directly connected to the drive source to rotate. At that time, forces acing on the second transmission member 632 are the same as those illustrated in FIGS. 7A and 7B.

The individual embodiments described above have respective configurations which can be combined with each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-208731, filed on Dec. 26, 2022, which is hereby incorporated by reference herein in its entirety.

What is claimed is:

1. A drive transmission mechanism for use in a recording apparatus, the drive transmission mechanism comprising:
   a drive source;

a first transmission member that is rotated by a drive force from the drive source;

a second transmission member that receives the drive force from the first transmission member so as to be rotated in a first direction and in a second direction opposite to the first direction;

a third transmission member that receives the drive force from the second transmission member so as to be rotated; and a support member inserted through a shaft hole of the second transmission member and having an outer peripheral surface, which includes a first region that receives a first pressing force from the second transmission member rotated in the first direction and which includes a second region that receives a second pressing force from the second transmission member rotated in the second direction, wherein the support member has a groove disposed on an upstream side of the first region in the first direction and on an upstream side of the second region in the second direction, wherein the first region is formed as a result of decentering of the shaft hole in a third direction with respect to the support member due to an action of a resultant force of a force acting from the first transmission member rotated in the first direction on the second transmission member and a force acting from the third transmission member on the second transmission member, and wherein the second region is formed as a result of decentering of the shaft hole in a fourth direction reverse to the third direction with respect to the support member due to an action of a resultant force of a force acting from the first transmission member rotated in the second direction on the second transmission member and a force acting from the third transmission member on the second transmission member.

2. The drive transmission mechanism according to claim 1, wherein the support member includes:
   a support shaft inserted through the shaft hole; and
   a base portion that supports the support shaft,
   wherein an outer peripheral surface of the support shaft includes:
   a first peripheral surface having a first diameter and being on a leading end side of the support shaft; and
   a second peripheral surface having a second diameter larger than the first diameter and being on further toward a root side of the support shaft than the first peripheral surface, and
   wherein the groove is provided in the first peripheral surface.

3. The drive transmission mechanism according to claim 2, wherein the second region gradually increases in diameter to be connected to the base portion.

4. The drive transmission mechanism according to claim 2, wherein the support member is made of a resin material, and the support shaft and the base portion are integrally molded.

5. The drive transmission mechanism according to claim 1, wherein the groove extends in a direction along a rotation axis line of the second transmission member.

6. The drive transmission mechanism according to claim 1, wherein the groove is provided in plurality.

7. The drive transmission mechanism according to claim 1, wherein the groove is provided so as to include the first region and the second region in a direction along a rotation axis line of the second transmission member.

8. The drive transmission mechanism according to claim 1, wherein each of the first transmission member, the second transmission member, and the third transmission member is a gear.

9. A recording apparatus comprising:

a recording portion that records an image on a sheet;

a conveying portion that conveys the sheet; and the drive transmission mechanism according to claim 1, wherein the drive transmission mechanism transmits a drive force from the conveying portion.

10. The recording apparatus according to claim 9, further comprising:

a sheet feeding portion that feeds the sheet to the conveying portion, wherein the conveying portion has a conveyance roller for conveying the sheet, and wherein the drive transmission mechanism transmits the drive force from the conveyance roller to the sheet feeding portion.

11. The recording apparatus according to claim 10, wherein, in a case where the second transmission member is rotated in the first direction, the conveyance roller is rotated so as to convey the sheet in a direction reverse to a conveyance direction, and wherein, in a case where the second transmission member is rotated in the second direction, the conveyance roller is rotated so as to convey the sheet in the conveyance direction.

\*   \*   \*   \*   \*